J. W. MILLARD.
AUTOMOBILE BRAKE MECHANISM.
APPLICATION FILED APR. 25, 1921.
1,431,975.
Patented Oct. 17, 1922.
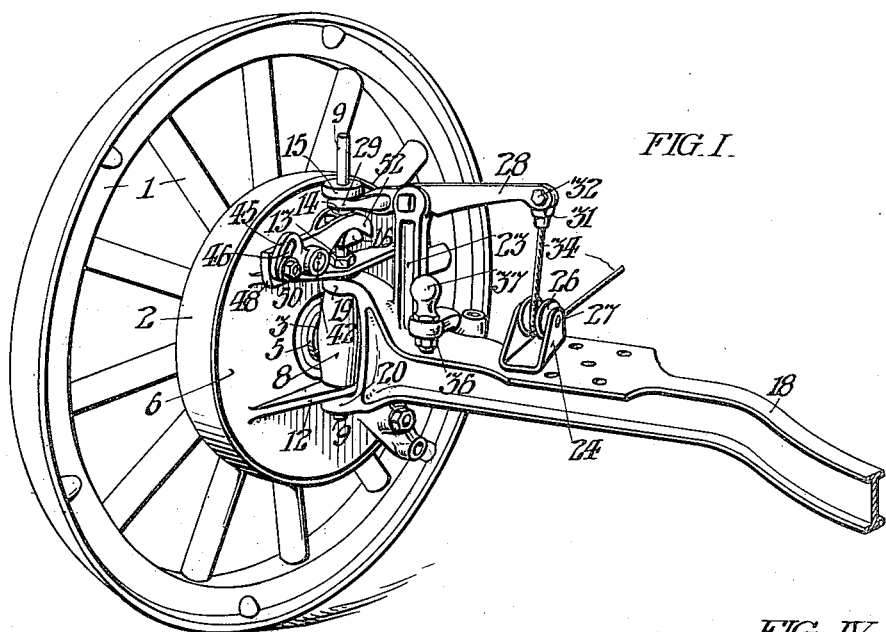
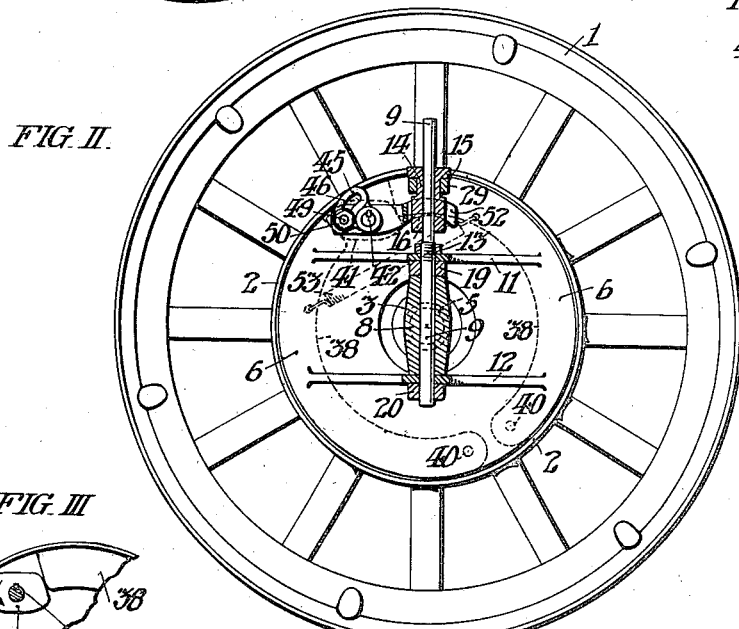
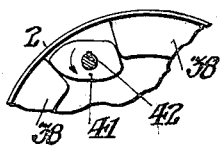
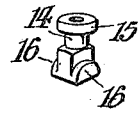
INVENTOR:
John Warren Millard, Patented Oct. 17, 1922.

1,431,975

UNITED STATES PATENT OFFICE.

JOHN WARREN MILLARD, OF UPPER DARBY, PENNSYLVANIA.

AUTOMOBILE BRAKE MECHANISM.

Application filed April 25, 1921. Serial No. 464,289.

*To all whom it may concern:*

Be it known that I, JOHN WARREN MILLARD, a citizen of the United States, residing at Upper Darby, in the county of Delaware and State of Pennsylvania, have invented a certain new and useful Improvement in Automobile Brake Mechanism, whereof the following is a specification, reference being had to the accompanying drawing.

It is the object and effect of my invention to provide dirigible road wheels of a vehicle with brake mechanism which may be operated regardless of the angular position of said wheels in relation to the vehicle body.

The form of my invention hereinafter described is designed for embodiment in connection with the front dirigible road wheels of an automobile of ordinary construction, and includes the combination with brake drums carried by said wheels, in rigid relation therewith; of brake shoes arranged to be operated by brake levers respectively carried by the steering knuckles upon which said wheels are mounted to rotate; sleeves mounted to slide vertically on the pintles which form the pivots of said steering knuckles in connection with the axle, and which are engaged with said brake levers; and levers fulcrumed on the axle, respectively engaged with said sleeves; whereby the brakes may be operated, in any angular position of said wheels with reference to said axle, by movement of the axle levers which effects sliding movement of said sleeves in respective coaxial relation with the pivots of said steering knuckles.

My invention includes the various novel features of construction and arrangement hereinafter more definitely specified.

In said drawing; Fig. I is a fragmentary perspective view of a vehicle axle, provided with a dirigible road wheel, and embodying my invention.

Fig. II is an inner face view of said wheel and its brake appurtenances, partly in section.

Fig. III is a fragmentary sectional view of the brake drum indicated on said wheel in the other figures, showing the relation of the brake shoes to the cam which operates them.

Fig. IV is a detached perspective view of the brake lever shown in Fig. II.

Fig. V is a detached perspective view of the sleeve which is mounted to slide in coaxial relation with the pivotal connection of the steering knuckle and axle, as shown in Figs. I and II.

In said figures; the road wheel 1 is provided with the hollow cylindrical drum flange 2 rigidly connected therewith in coaxial relation with the axis of rotation of said wheel. The steering knuckle 3 has an axle spindle 5, of the usual conical form, upon which said wheel is mounted to rotate, and has the disk 6 in coaxial relation with said drum flange 2 forming a closure for the space within the latter. The vertical pintle bearing 8, on said knuckle 3, has the pintle 9 extending in said bearing and projecting above and below it, forming the pivot of said knuckle. Said pintle extends through the bracket ribs 11 and 12 on said disk 6 and is rigidly connected with the same by the nut 13 which engages a screw thread on said pintle and bears upon the upper surface of said rib 11. The slide sleeve 14 is mounted for vertical reciprocation on the upper portion of said pintle 9, and has the circumferential lifting flange 15 at the top thereof and transversely extending pivot lugs 16 at the bottom thereof.

The axle member 18 has bifurcated vertical pintle bearings 19 and 20, embracing said pintle bearing 8 of said knuckle 3, and engaging said pintle 9; said bifurcations extending respectively beneath said bracket ribs 11 and 12, and said bifurcation 19 resting upon the upper end of said bearing 8, as best shown in Fig. II. Said axle member 18 has the fulcrum bearing standard 23 adjoining said pintle bearings 19 and 20, and also has the sheave bearing 24, nearer the center of the vehicle than said fulcrum bearing. The sheave 26 is mounted to rotate upon the shaft 27 in said sheave bearing 24. The axle lever 28 is fulcrumed in said fulcrumed bearing 23 to oscillate in a vertical plane and has its outer end 29 bifurcated and embracing said sleeve 14 between said lifting flange 15 and pivot lugs 16. The flexible connector coupling 31 is pivotally carried at the inner end of said lever 28, conveniently upon the bolt 32, and the flexible connector 34 extends from said coupling 31 around said sheave 26; whereby, traction upon said connector is effective to lift said slide sleeve 14 vertically on said pintle 9; regardless of the angular position of said wheel 1 with reference to said axle 18, which is variably determined by the position of the steering knuckle arm 36 which is rigidly connected with said disk 6 and has the ball bearing stud 37 at its inner end for co-operation with the usual steering connections.

The pair of semiannular brake shoes 38 are pivotally mounted in the space within said drum flange 2 upon a pair of pivot studs 40 rigidly connected with said disk 6, near the bottom thereof, as shown in Fig. II. The double faced cam 41 is rigidly connected with the end of the rock shaft 42 and fitted between the free ends of said brake shoes 38, as best shown in Fig. III, to force them into frictional engagement with said brake drum flange 2 when said rock shaft 42 is turned in the direction of the arrow marked on said cam in Fig. III. Said rock shaft 42 is journaled in said steering knuckle disk 6, parallel with the axis of said spindle 5 and has the sector 45 rigidly connected therewith and provided with the arcual slot 46 concentric with said shaft 42. The brake lever 48 is fitted to turn on said rock shaft 42, but has the stud bolt 49 extending through said arcual slot 46 and engaged by the nut 50; whereby said brake lever 48 may be adjusted in variable angular relation with said cam 41 to compensate for wear upon said cam, flange 2, and parts of said brake shoes 38 contiguous thereto. Said brake lever 48 has a pair of downwardly curved fingers 52 at the free end thereof, embracing said sleeve 14 and engaging said pivot lugs 16; whereby, traction on said flexible connector 34 causes said brake shoes 38 to frictionally engage said drum flange 2 and thus apply the brake mechanism. When the tensile strain upon said connector 34 is relaxed, said sleeve 14, and the parts connected therewith, are drawn downward by the spring 53, which then acts to automatically release the brake shoes 38 from their frictional engagement with said brake drum flange 2 by drawing said brake shoes 38 together against said cam 41 and turning the latter in the reverse direction to that indicated by the arrow in Fig. III which, of course, turns said brake lever 48 downwardly, in engagement with said pivot lugs 16 on said sleeve 14.

As far as I am aware; it is broadly new to provide a dirigible wheel with a brake mechanism which may be operated in any angular position of said wheel with reference to the vehicle body, by mechanism upon the latter, through the medium of a sleeve which is mounted for reciprocation in co-axial relation with the pivotal connection between the chassis and a steering knuckle which carries the axle spindle upon which the wheel rotates. For instance, although I have found it convenient to operate the axle lever 28 by means of a flexible connector 34 extending around the sheave 26; any other suitable means may be employed for operating said lever 28.

Therefore, I do not desire to limit myself to the precise details of construction and arrangement herein set forth, which are merely designed for the specific construction chosen for illustration, as it is obvious that various modifications may be made therein, without departing from the essential features of my invention, as defined in the appended claims.

I provide the annular disk 6 with the ribs 11 and 12, merely to conveniently rigidly connect it with an old steering knuckle 3; by means of the pintle 9. However, said parts 3 and 6 may be otherwise rigidly connected.

I claim:

1. In vehicle brake mechanism; the combination with a road wheel; of a brake drum rigidly connected with said wheel; a steering knuckle having an axle spindle upon which said wheel is mounted to rotate; a pintle forming the pivot of said knuckle; a slide sleeve mounted for vertical reciprocation on the axis of said pintle; said sleeve having a circumferential lifting flange at the top thereof and transversely extending pivot lugs at the bottom thereof; an axle member having a knuckle bearing at its end, engaging said pintle; a fulcrum bearing on said axle member; a lever fulcrumed in said fulcrum bearing on said axle member, said lever having its outer end bifurcated and embracing said sleeve, between said lifting flange and pivot lugs; a pair of substantially semiannular brake shoes fitted to frictionally engage the surface of said brake drum; a pair of pivot studs rigidly connected with said respectively pivotally engaging ends of said brake shoes; a cam fitted to operate the free ends of said brake shoes; a rock shaft carrying said cam; a brake lever fitted to turn said rock shaft; means whereby said brake lever may be adjusted in variable angular relation with said cam; and a pair of downwardly curved fingers at the free end of said brake lever, embracing said sleeve and engaging said pivot lugs.

2. In vehicle brake mechanism; the combination with a road wheel; of a brake drum rigidly connected with said wheel; a steering knuckle having an axle spindle upon which said wheel is mounted to rotate; a pintle forming the pivot of said knuckle; a slide sleeve mounted for reciprocation on the axis of said pintle; an axle member having a knuckle bearing at its ends, engaging said pintle; a fulcrum bearing on said axle member; a lever fulcrumed in said fulcrum bearing on said axle member; said lever having its outer end engaging said sleeve; a pair of brake shoes fitted to frictionally engage the surface of said brake drum; a pair of pivot studs rigidly connected with said axle member respectively pivotally engaging the ends of said brake shoes; a cam fitted to operate the free ends of said brake shoes; a rock shaft carrying said cam; a brake lever fitted to turn said rock shaft and having means engaging said sleeve.

3. In vehicle brake mechanism; the combination with a road wheel; of a brake drum rigidly connected with said wheel; a steering knuckle having an axle spindle upon which said wheel is mounted to rotate; a pintle, forming the pivot of said knuckle; a slide sleeve mounted for reciprocation on the axis of said pintle; an axle member having a knuckle bearing at its end, engaging said pintle; a fulcrum bearing on said axle member; a lever fulcrumed in said fulcrum bearing on said axle member; said lever having its outer end engaging said sleeve; a brake shoe fitted to frictionally engage the surface of said brake drum; a rock shaft arranged to operate said brake shoe; a brake lever fitted to turn said rock shaft, and having means engaging said sleeve.

4. In vehicle brake mechanism; the combination with a road wheel; of a brake drum rigidly connected with said wheel; a steering knuckle having an axle spindle upon which said wheel is mounted to rotate; a pintle, forming the pivot of said knuckle; a slide sleeve mounted for reciprocation on the axis of said pintle; an axle member having a knuckle bearing engaging said pintle; a fulcrum bearing on said axle member; a lever fulcrumed in said fulcrum bearing and engaging said sleeve: a brake shoe fitted to frictionally engage the surface of said brake drum; a rock shaft arranged to operate said brake shoe; and a brake lever fitted to turn said rock shaft, and having means engaging said sleeve.

5. In vehicle brake mechanism; the combination with a road wheel; of a brake drum rigidly connected with said wheel; a steering knuckle having an axle spindle upon which said wheel is mounted to rotate; a pintle, forming the pivot of said knuckle; a slide sleeve mounted for reciprocation on the axis of said pintle; an axle member having a knuckle bearing at its end, engaging said pintle; a fulcrum bearing on said axle member; a lever fulcrumed in said fulcrum bearing and engaging said sleeve; a brake shoe fitted to frictionally engage the surface of said brake drum; and a brake lever arranged to operate said shoe, and having means engaging said sleeve.

In testimony whereof, I have hereunto signed my name at Upper Darby, Pennsylvania, this 13th day of April, 1921.

JOHN WARREN MILLARD.

Witnesses:
ALLEN S. DUNN,
LEWIS JONES, Jr.